Aug. 27, 1957   E. T. DAVIS   2,804,268
CONDITION DIFFERENCE CONTROL SYSTEM
Filed Jan. 21, 1953   4 Sheets-Sheet 1

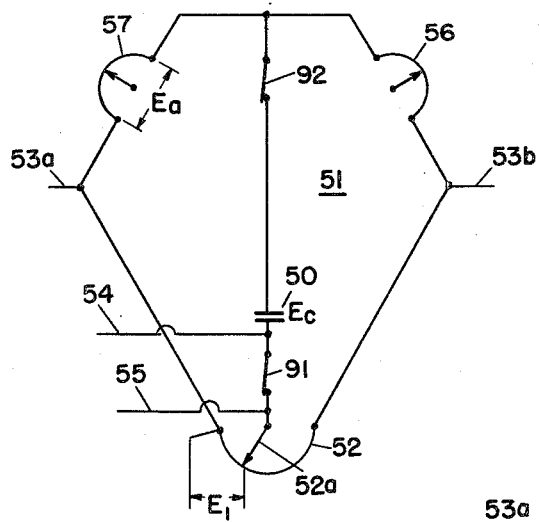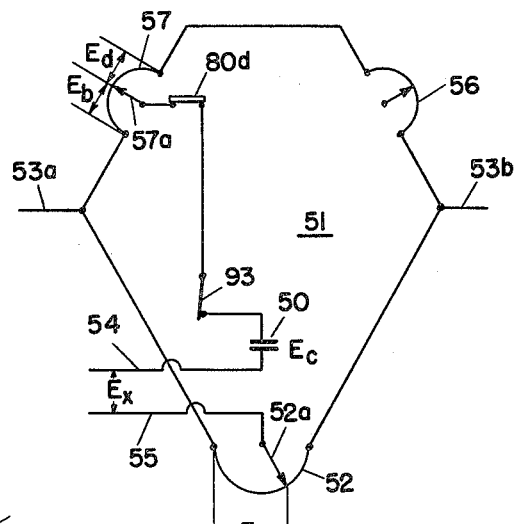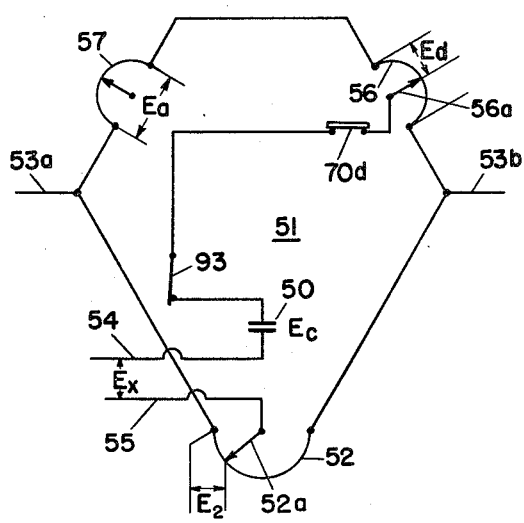

United States Patent Office 2,804,268
Patented Aug. 27, 1957

2,804,268

CONDITION DIFFERENCE CONTROL SYSTEM

Elwood T. Davis, Havertown, Pa., assignor to Leeds and Northrup Company, Philadelphia, Pa., a corporation of Pennsylvania Application January 21, 1953, Serial No. 332,231

18 Claims. (Cl. 236—15)

This invention relates to improvements in condition-control systems, and more particularly to a control system responsive to temperature-sensitive devices for regulating the temperature difference between radiant bodies, and has for an object the provision of a reliable simplified system for controlling reversals in regenerative furnace operation in accordance with selected temperature conditions within the furnace.

Regenerative furnaces, usually of the open hearth type, include a plurality of checker-brick chambers through which combustion air and fuel pass on the way to be ignited within the furnace. In order that maximum efficiency be attained in the operation of the furnace, it is desirable to elevate the temperature of the fuel and combustion air before combustion within the furnace. To this end, the checker-brick chambers at opposite ends of the open hearth alternately receive heat from the products of combustion of the furnace and alternately give up heat to the fuel and combustion air.

The operation of the furnace must be reversed periodically in order to prevent the excessive cooling or the over-heating of the material comprising the checker-brick chambers. Preferably, the reversal is effected upon the existence of a predetermined temperature differential between the regenerative checker-brick chambers. In this way the furnace may be operated at a higher average temperature with a corresponding increase in efficiency thereof as regards time required for melting each charge.

In accordance with the present invention, the control system is provided for determining the extent and sense of temperature difference between two radiant bodies such as the checker-brick chambers of the regenerative furnace. The signal derived from the control energizes a furnace-reversing means whose direction of operation is dependent upon the polarity of the signal.

Though applicable generally to heating and cooling systems where difference-temperatures are not to exceed selected values and where a control action is to be made dependent upon relative magnitudes of selected conditions, the present invention is particularly useful in connection with regenerative furnaces. By utilizing a capacitor with a circuit for charging it to a predetermined voltage representative of the magnitude of a condition, a comparison may be had with the magnitude of a voltage representative of the magnitude of a second condition as by connecting the capacitor in circuit with the second voltage. A polarity-sensing means is responsive to the difference voltage and when the one voltage representative of one condition exceeds that representative of the other condition by a predetermined magnitude the polarity-sensitive means selectively responds for the desired control operation as, for example, the furnace reversal above described.

More particularly, the control system includes a balanceable network having a variable impedance or potentiometer for unbalancing the network in response to the temperature of one of the chambers. The extent of unbalance is represented by a potential which is placed upon a capacitor which stores the extent of unbalance. The capacitor is connected with a pair of series impedances at their common juncture point. The impedances provide a potential representative of a maximum temperature difference to be permitted between the checker-brick chambers of the furnace. Upon a subsequent unbalance of the network brought about in response to the temperature of the other of said chambers, the variable impedance, one of the temperature-difference impedances, and the capacitor are serially connected and the signal derived therefrom is placed upon a polarity-sensitive means which will effect a reversal of the furnace when the difference in potential between that stored by the capacitor and that of the variable impedance exceeds the potential representative of the maximum temperature difference to be permitted between the chambers.

The invention also resides in the provision of a means responsive to the individual magnitudes of the conditions controlled for effecting a reversal thereof whenever the magnitude of either one exceeds a critical or predetermined selected value.

For a more complete understanding of the invention and for further objects and advantages thereof, reference may be had to the accompanying drawings, wherein:

Fig. 1 diagrammatically illustrates a system embodying the present invention;

Figs. 2-4 diagrammatically illustrate the essential elements of the invention in a series of equivalent circuits effected during operation of the system;

Figure 1:
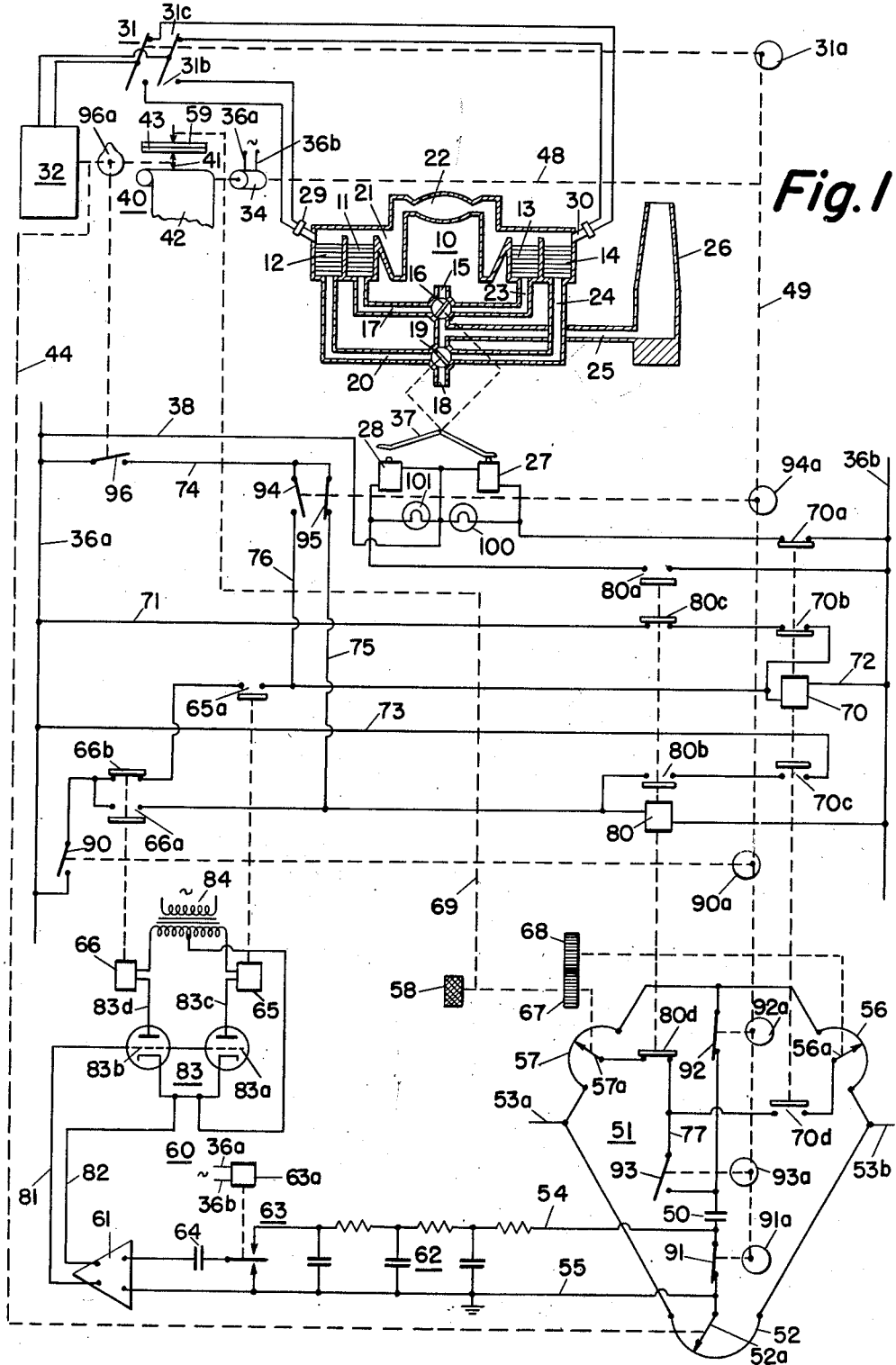

Though of general application, the invention in its preferred form has been shown applied to the control of a regenerative open hearth furnace 10 provided with checker-brick chambers 11—12 on one side thereof and checker-brick chambers 13—14 on the other side thereof. As well understood by those skilled in the art and as explained in my Re. Patent 23,561, maximum efficiency is attained in the operation of the furnace 10 by utilizing the checker-brick chambers 11—14 to preheat fuel and combustion air en route to the open hearth. With the parts in the positions illustrated in Fig. 1 fuel from a supply line 15 flows by way of valve 16 and pipe 17 to the checker-brick chamber 11 and thence into the combustion zone 21 of the open hearth 22. Combustion air for the fuel simultaneously flows from inlet line 18 by way of valve 19 and pipe 20 to the checker-brick chamber 12. The air mixes with the fuel from chamber 11 and the hot products of combustion from zone 21 flow into the open hearth 22 to melt the charge. The products of combustion exit by way of checker-brick chambers 13 and 14 by way of pipes 23 and 24, the valves 16 and 19, and a common duct 25 leading to a stack 26.

In the foregoing description it has been assumed the furnace has been in operation and that the checker-bricks of chambers 11 and 12 are at elevated temperatures, while the checker-bricks in chambers 13 and 14 are at lower temperatures. In order to prevent the melting, fusing or sagging of the checker-bricks which fill the chambers 11—14, it is necessary periodically to reverse the operation, that is, to utilize the stored heat in chambers 13 and 14 to preheat the air and fuel and again to elevate the temperature of the checker-brick in chambers 11 and 12 preparatory to a further reversal in operation. Thus, the air and fuel may be maintained at a high average temperature prior to combustion, the result of which is a desired shortening of the time required to bring the charge in the open hearth 22 to the desired temperature.

As explained in my Re. Patent 23,561, it has been found that the reversal in operation may be best achieved by utilizing radiation pyrometers arranged directly to view the checker-brick. Thus in Fig. 1 radiation pyrometers 29 and 30 are disposed in view of the checker-brick in chambers 12 and 14. While the system disclosed in my said patent is satisfactory and has been commercially used, nevertheless in accordance with the present invention a system of equal reliability, of lower cost, and operating in a considerably different manner has been provided.

In accordance with the present invention, Figs. 1 and 2, a capacitor 50 is provided in a balanceable network 51 and, as will be later explained, the capacitor is charged until its voltage represents the magnitude of one condition, namely, the temperature of the checker-brick within chamber 14. After the charging of the capacitor it is connected, Fig. 3, in a circuit in which there is developed a voltage representative of the temperature of the checker-brick within chamber 12. A sensitive device 60, Fig. 1, is connected to the comparison circuit and is selectively operated when one of said voltages exceeds the other of said voltages, the comparison circuit preferably including a biasing voltage establishing a selected differential of temperature as between the checker-brick of chambers 12 and 14.

The manner in which the foregoing operations are automatically carried out will now be set forth in detail. Continuing the assumption of operation with the parts in their illustrated positions, it will be observed that a relay 70 is in its energized position by virtue of an energizing circuit which may be traced from supply line 36a by way of conductor 71, contacts 80c, contacts 70b, the operating coil of relay 70, and by conductor 72 to the other supply line 36b. A solenoid 27 which operates an armature 37 to move and to retain the valves 16 and 19 in their illustrated positions is energized from supply line 36a by way of a conductor 38, the coil 37, and by way of contacts 70a to the other supply line 36b. A signal light 100 connected across coil 27 is energized and thus may remotely indicate the position of the valve. The radiation pyrometer 30 is connected by way of a double pole, double throw switch 31, closing on its contacts 31c, to a measuring system 32 which may be of any suitable type, such as disclosed in Squibb Patent No. 1,935,732, but preferably of the type disclosed in Williams Patents Nos. 2,113,164 and 2,113,436.

The measuring system includes a motor which positions a pen-index 41 of indicator-recorder 40 relative to a record chart 42 and a scale 43. The motor or driving element which positions the pen-index 41 by way of a suitable mechanical connection, such as a shaft, indicated by the broken line 44 relatively adjusts a variable impedance or slidewire 52 and its associated contact 52a which is included in the balanceable network 51. Thus the position of the contact 52a relative to slidewire 52 will unbalance network 51, shown as of the Wheatstone type, in degree dependent upon the temperature of the checker-brick in chamber 14. While radiation pyrometers are preferred, it is to be understood that thermocouples or other temperature-responsive devices may be utilized. Since hot combustion products are passing over checker-brick chamber 14, the temperature thereof will be rising and, as shown, contact 52a will be moving in a direction to change the unbalance of network 51. That network, energized from any suitable source of supply as indicated by lines 53a and 53b, develops in the circuit including the capacitor 50 an unbalance voltage. Thus, the charge acquired by the capacitor is related to the temperature or condition of checker-brick in the chamber 14.

A comparison between the temperature of the checker-brick in chamber 14 and that in chamber 12 periodically takes place and preferably within fairly short time intervals of the order of from 30 seconds to one minute. The comparison, on a time cycle, may be readily attained by utilizing the chart-driving motor 34 to drive through a gear reduction (not shown) as indicated by broken lines 48 and 49 a series of control cams 31a and 90a–94a. The cams 31a, 90a–94a simultaneously operate their respective switches. Thus, as the reversing switch 31 is moved to connect the radiation pyrometer 29 to the measuring system 32, the switches 92 and 91 are opened by cams 92a and 91a while the switch 93 is closed by cam 93a.

Prior to the opening of switches 91 and 92 it will be observed that the switch 91 by-passes or short-circuits the input circuit to the sensitive polarity-responsive device 60 while the switch 92 completes the charging circuit for the capacitor 50. As switches 91 and 92 open, the charging circuit is interrupted. The cam 31a now closes, reversing switch 31 on its contacts 31b to apply the output from radiation pyrometer 29 to the measuring system 32. This system immediately operates at high speed to move the contact 52a to a new position corresponding with the balancing position for the measuring system 32. After the system attains balance contact 93 closes thereby completing the comparison circuit by way of closed relay contact 80d and the polarity-sensitive detector 60 responds to the potential difference appearing between the input conductors 54 and 55. Remembering, however, that checker-brick chamber 14 is at a lower temperature than checker-brick chamber 12, the position of contact 52a relative to slidewire 52 will be such that the net voltage output Ex will be of such polarity as to energize a relay 65. Closure of relay 65, however, does not affect the positions of the parts shown in Fig. 1 since the operating coil for relay 70 receives its energization through a holding circuit which may be traced from supply line 36a by way of conductor 71, contacts 80c, contacts 70b, relay coil 70, and by conductor 72 to the other line 36b.

Figure 5:
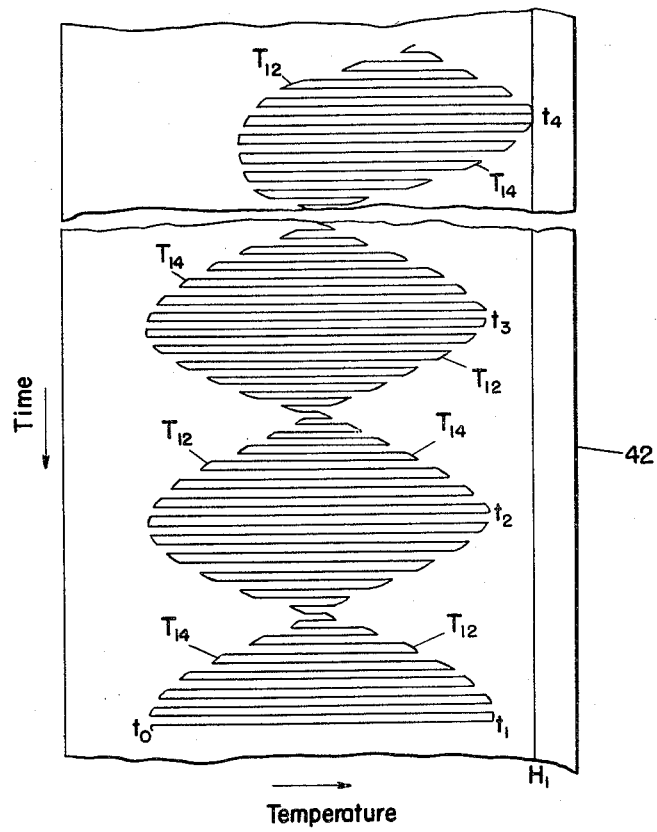
Fig. 5 is a graph explanatory of the manner of operation of the system.

Referring now to Fig. 5 the operation thus far described graphically appears on a section of the recorder chart 42. With the conditions above assumed, the pen-index 41 occupies at time $t_0$ a position corresponding with the temperature of the checker-brick in chamber 14. At the instant of operation of the reversal switch 31, measuring system 32 operates the pen-index 41 at high speed in an upscale direction, and at the time $t_1$ the pen-index arrives at a position corresponding with the temperature of the checker-brick in chamber 12. It will be understood that under the control of the cams driven by motor 34 and the associated apparatus the reversing switch 31 will be alternately operated for the measurement of the temperature first within one checker-brick chamber and then within the other. Thus, there will appear on the record chart 42 a record showing a progressive rise in the temperature of chamber 14 and a progressive fall of temperature within chamber 12. The rising temperature is shown by the broken line $T_{14}$ and the falling temperature by the broken line $T_{12}$. The temperatures of the two chambers 12 and 14 approach each other, eventually become equal in magnitude, and then temperature $T_{14}$ exceeds temperature $T_{12}$. However, for maximum efficiency of operation, furnace reversal does not take place until there has been a predetermined reversal of temperature difference as between them. For example, the temperature $T_{12}$ of chamber 12 continues to decrease and the temperature $T_{14}$ continues to rise until time $t_2$. Thus, the temperature difference between the two is the same as at the beginning of the record on chart 42 of Fig. 5, but in the opposite direction.

When the described temperature conditions have been attained the comparison circuit of Fig. 3 produces an output voltage Ex of reverse polarity. That output voltage Ex of reversed polarity produces energization of relay 66 which, it will be observed, closes its contacts 66a and opens its interlock contacts 66b. The switch 90 is closed by cam 90a at a time interval after the switch 91 is opened by the cam 91a. Accordingly, the contacts 66a complete an energizing circuit for the coil of relay 80 which may be traced from supply line 36a by way of contacts 90, 66a, and by way of operating coil 80 to the other supply line 36b. The energization of relay 80 opens its contacts 80c to deenergize relay 70. Upon its deenergization its contacts 70c are closed to complete a holding circuit for the relay coil 80 which may be traced from supply line 36a by conductor 73, contacts 70c, interlock contacts 80b, and by operating coil 80 to the other supply line 36b. Relay 80 opens its contacts 80d and also closes its contacts 80a. It will be seen that the opening of the contacts 70a deenergizes the solenoid 27, while the closure of contacts 80a completes an energizing circuit for the solenoid 28 which may be traced from supply line 36a by way of conductor 38, solenoid 28, and by way of contacts 80a to the other supply line 36b. A signal lamp 101 connected across coil 28 is energized remotely to indicate that the valves 16 and 19 have been operated to their other positions for flow of fuel and air into checker-brick chambers 13 and 14 and for exit of combustion gases by way of chambers 11 and 12.

With the furnace reversal accomplished, as described, it will be understood that the temperature of chamber 12 will now begin to rise, as shown by the continuation of the broken line following the time $t_3$ while the temperature in chamber 14 will begin to decrease. The operations will be, in general, similar to those previously described in the reversal of the furnace occurring at the time $t_2$.

Inasmuch as there has been reversal of the furnace, it is necessary to reverse the bias voltage appearing in the comparison circuit, and this is accomplished by the commutation of lead 77 to transfer that comparison circuit by the opening of contacts 80d and the closing of contacts 70d to the movable contact 56a of a slidewire 56 connected in an adjacent arm of the network 51. Thus, while the charging circuit remains the same, as shown in Fig. 2, the bias voltage introduced by the slidewire 56 will have a polarity in the comparison circuit opposite that introduced by the slidewire 57 in the comparison circuit shown in Fig. 3. Accordingly, the polarity-sensitive means 60 will successively energize the relay 66, but the circuit connections are not changed by reason of the holding circuit previously traced for the operating coil of relay 80. However, at the time $t_4$ the difference temperature of the checker-bricks will have reached an optimum point, whereupon the comparison circuit or balanceable network 51 of Fig. 4 will produce an output Ex of reverse polarity for energization of relay 65. When this relay is energized, an energizing circuit is completed for the operating coil of relay 70 which may be traced by way of contact 90, interlock contact 66b, contacts 65a, by way of operating coil 70 and conductor 72 to the supply line 36b. The opening by relay 70 of its contacts 70c deenergizes relay 80 which returns to its illustrated position, the remaining contacts of relay 80 again occupying their illustrated positions, the function of each of which has already been described.

Figure 6:
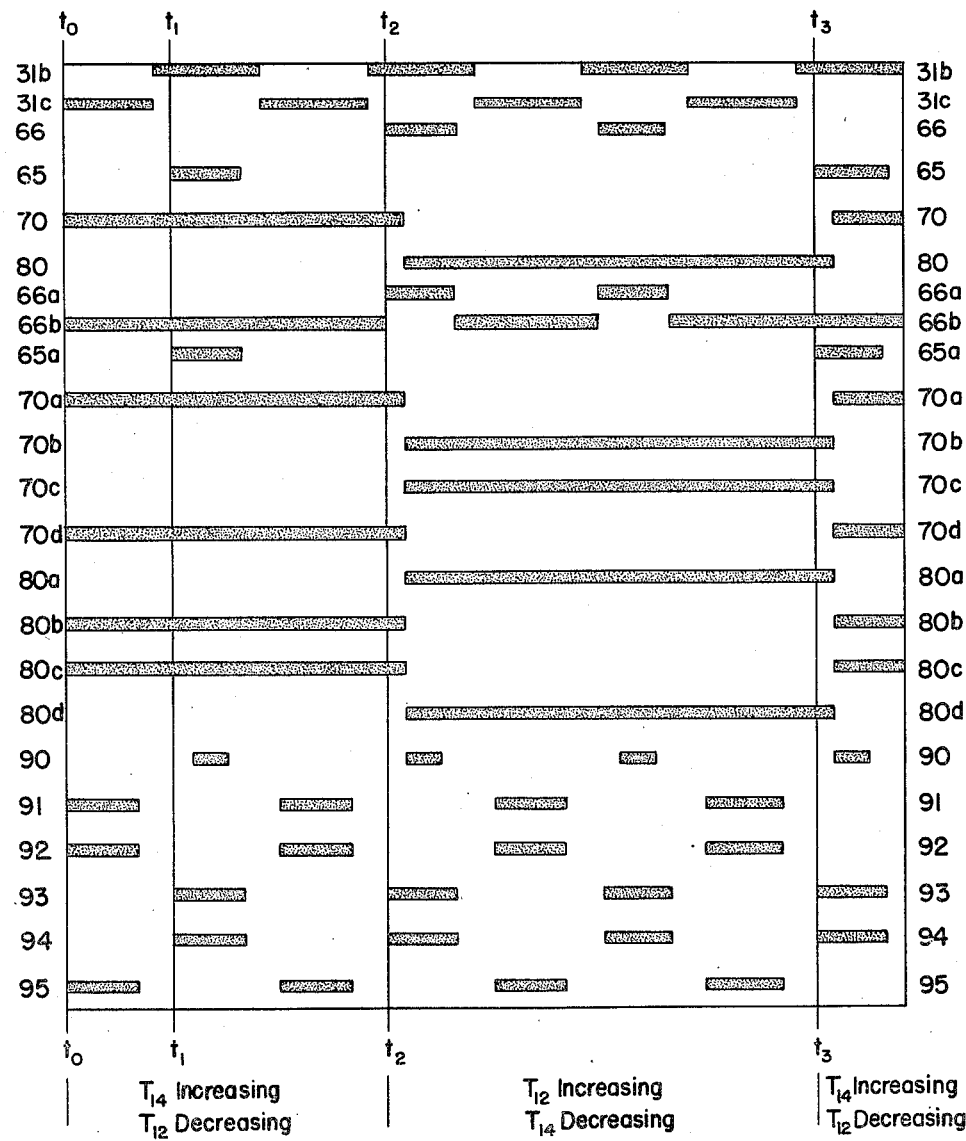
Fig. 6 is a chart disclosing the operative relationships between circuit relays and interrupters during cyclical operation of the furnace.

The overall picture of sequential operations above described and their relation one to the other appears from the time chart of Fig. 6 in which the heavy lines indicate the circuit-closed positions, and the open spaces between them, the time during which the contacts are in open position.

As set forth above, Figs. 2, 3 and 4 are equivalent circuits representing the phases of operation of the balanceable network 51 and reference will be made thereto for development of mathematical expressions for a better understanding of the invention. Fig. 2 illustrates the equivalent circuit which will be effected each time the overall system responds to the output of radiation pyrometer 30 recording the temperature of checker-brick chamber 14, under which condition, as above described, interrupter contacts 91 and 92 are closed to effect a charging circuit for the capacitor 50. The charge acquired by the capacitor 50, which may be represented by the expression Ec, is through a circuit including slidewire 57 and slidewire 52 producing a voltage $E_1$, the extent of which is determined by the magnitude of the temperature within checker-brick chamber 14 and which is opposed by a voltage $E_A$ across the slidewire 57. Therefore, the expression for the charge on capacitor 50 may be set forth as $$E_C = E_1 - E_A \qquad (1)$$

Thereafter as a result of operation of the various cams included in the system, the output of radiation pyrometer 29, viewing the temperature of checker-brick chamber 12, is included in the system, and the comparison circuit or balanceable network 51 assumes the equivalent circuit illustrated in Fig. 3. The potentiometer 52 is again adjusted, this time in accordance with the magnitude of temperature of checker-brick chamber 12, to produce a voltage $E_2$. After the potentiometer slidewire 52 is adjusted interrupter contact 93 is closed by operation of cam 93a and, in cooperation with previously opened contact 91 and closed relay contact 80d effects the series-circuit illustrated which includes the capacitor 50, a portion of potentiometer 57 and potentiometer 52, and thereby produces a resultant voltage Ex, the polarity of which will determine the operation of the system. Ex may be expressed as follows:

$$E_X = E_2 - (E_C + E_B) \qquad (2)$$

As illustrated, the potentials determined by the position of potentiometer 57 have been designated: $E_A$, the total voltage drop across the potentiometer; $E_B$, the voltage drop across a portion of the potentiometer; $E_D$, the voltage drop representative of the desired temperature difference between opposite checker-bricks of the furnace, the attainment of which causes reversal of the furnace 10.

By inserting the expression for Ec set forth in Equation 1 in the Equation 2 there is derived $$E_X = E_2(E_1 - E_A + E_B) \qquad (3)$$

and since $E_D = E_A - E_B$, then $$E_X = E_D - (E_1 - E_2) \qquad (4)$$

It is apparent from this final expression that as long as the positive value of $(E_1 - E_2)$ is less than the value of $E_D$, the polarity of the voltage Ex appearing across the input of the amplifier 61 will remain unchanged, but that when the positive value of $(E_1 - E_2)$ exceeds the value of $E_D$ the polarity of Ex will change, in this case becoming negative to effect a reversal in the operation of the regenerative furnace in a manner set forth above. The final expression of Equation 4 also illustrates the fact that the potentiometer 57, and also, as will be shown hereinafter, potentiometer 56, determines the temperature difference at which it is desirable to reverse the burning within the furnace. This temperature difference, represented by voltage $E_D$, may be varied by manipulating a knob 58 (Fig. 1) to vary the positions of slidewire contacts 56a and 57a along their respective slidewires. The potentiometer slidewires 56 and 57 are adjusted in opposite directions so that the impedance from their respective contacts to their common point of connection is equal. This opposed movement is effected by means of spur gears 67 and 68. The movement of the slidewires may be recorded on an indicator 59, shown coupled to knob 56 by broken line 69, to indicate at any moment the conditions under which the furnace will be reversed.

The above-described operation of the system will continue, alternately effecting the equivalent circuits illustrated in Figs. 2 and 3 until time $t_2$, whereupon, as illustrated in Fig. 5, the difference in temperature between opposite checker-brick chambers has reached a magnitude at which the positive value of $(E_1-E_2)$ exceeds the value of $E_D$ and the polarity of voltage $E_x$ is reversed.

Now, as the system connects the output of pyrometer 30, the balanceable network 51 again effects the equivalency illustrated in Fig. 2, whereupon the capacitor 50 is again charged in a like manner to that above-described. As before, the capacitor 50 holds its charge while the system again functions, this time to look at the output of radiation pyrometer 29. The potentiometer slidewire 52, in response to the balance of the measuring system 32, produces a new voltage $E_2$ (Fig. 4). It is observed that the voltage $E_2$ is now serially connected with the charged capacitor 50, upon the opening of interrupter switch 91, through interrupter contact 93, contact 70d, a portion of the impedance of slideware 56 representative of the difference voltage $E_D$, and the entire impedance of slidewire potentiometer 57. The change in circuitry during the comparing stage in the system from Fig. 3 to that shown in Fig. 4 is made necessary to effect an operation whereby the system will operate in a manner such that there will be a complete reversal in the operation of the regenerative furnace 10, and another reversal will not be forthcoming until conditions of temperature at opposite ends of the furnace are reversed.

If the commutation of lead 77 alternates from slidewire contact 57a (Fig. 3) to slidewire contact 56a (Fig. 4), as by operation of relay contacts 70d and 80d, the furnace would be reversed but momentarily and would soon revert back to the original conditions of operation. This proposition may be more readily understood by reference to the afore-derived expression in Equation 4. It was noted there that upon $E_1$ exceeding $E_2$ in amount greater than the value of $E_D$, the polarity of $E_x$ changed and that it was the polarity change in $E_x$ which effected a reversal of the system. If the circuitry were not changed upon reversal, in the manner described, then there would occur soon after the first reversal, a second reversal, because the positive value of $(E_1-E_2)$ would decrease sufficiently so as to again change the polarity of $E_x$ and make it positive. The effect of the circuit of Fig. 4 is to reverse the polarity of $E_D$ so that operations will now be dependent upon $E_2$ exceeding $E_1$ by an amount greater than $E_D$. This factor may be determined by deriving a new expression for the resultant voltage $E_x$ from Figs. 2 and 4. By reference to Fig. 4, $E_x$ may be expressed as $$E_x = E_2 - (E_C + E_D + E_A) \quad (5)$$

or $$E_x = E_2 - (E_C + 2E_D + E_B) \quad (6)$$

By inserting the expression for $E_C$ set forth in Equation 1 in Equation 6:

$$E_x = E_2 - (E_1 - E_A + E_B + 2E_D) \quad (7)$$

and since $-E_D = -E_A + E_B$, $$E_x = -E_D - (E_1 - E_2) \quad (8)$$

It will be observed from Equation 8 that the polarity of $E_x$ will become positive only when $E_2$ exceeds $E_1$ in amount greater than $-E_D$.

In addition to the temperature difference control, there is provided a secondary means for reversing the operation of the furnace 10 which is dependent upon the extent of heat accumulated by either of the checker-brick chambers 12 and 14 and which, in operation, does not affect the synchronous action of the temperature difference control. This supplementary reversing system is added as a safety means for protecting the elements of the furnace against excessive heat, since it is readily conceivable that if the furnace control were based solely on temperature difference, it might be possible for the temperatures of the checker-brick chambers 11—14 to rise to a point at which the checker-brick components would fuse or melt and yet the furnace would not be reversed because the temperature difference between the chambers had not reached the predetermined value. This condition is illustrated in Fig. 5 at time $t_3$ in which the temperature $T_{14}$ is shown to exceed a critical temperature $H_1$, while the temperature difference between chambers 12 and 14 has not reached a temperature difference required for the normal reversal of the furnace.

In accordance with the present invention, a high-temperature reversal circuit is provided to energize either relays 70 or 80 dependent upon which end of the furnace is being overheated. The energization of these relays is initiated by a cam-actuated interrupter switch 96 which is driven by a cam 96a mounted on the shaft 44. The movement of the cam 96a is, like the slidewire 52, proportional to the extent of the temperature of the checker-brick chamber under observation. In accordance therewith, the cam 96a is provided with a high point located at the periphery thereof at a point corresponding to the critical temperature $H_1$. When during the course of attaining balance the system 32 effects a rotation of shaft 44 to a point corresponding to the critical temperature $H_1$, the cam 96a will effect a closure of the switch 96.

Closure of switch 96 will then energize either relay 70 or 80. For example, if the chambers 13 and 14 are being heated, and the temperature thereof exceeds the critical point $H_1$, the relay 80 will be energized through a circuit from supply line 36a through interrupter switch 96, conductor 74, contact 95, conductor 75, the coil of relay 80, and to the other supply line 36b. The operation of relay 80 will effect a reversal of the furnace by disrupting the holding circuit of relay 70 through the opening of contact 80c, and solenoid 28 will be energized.

The same mode of operation holds true when the checker-brick chambers 11 and 12 are being heated, during which time it will be remembered relay 80 is energized. However, the relay 80 will be deenergized by the operation of relay 70 which is energized from supply line 36a through contact 96, conductor 74, contact 94, conductor 76, relay coil 70, conductor 72, and to the other supply line 36b. The operation of relay 70, like that of relay 80 above, will affect the other components of the control circuit in the same manner as though a reversal had been effected through the temperature-difference control, that is, the holding circuit for relay 80 will be disrupted through the opening of contact 70c, and solenoid 27 will be energized.

In order to effect the high-point reversal last described, it is necessary that the timing of cam-operated switch 90 be properly adjusted with respect to the operation of switch 94. As observed from the time chart in Fig. 6, the switch 94 is timed to close an instant before the closure of interrupter contact 90 at which time the relay 80 is energized solely through its above-described holding circuit and, therefore, before the interrupter switch 90 closes, relay 70 will be energized to open the holding circuit of relay 80 and the desired reversal will take place.

It will be observed that the action of the high-point reversing circuit in effect simulates the operation produced by the selected temperature difference to produce a reversal of the furnace by selectively energizing either relay 70 or 80. The control system is operated in like manner as when reversal is effected by the temperature difference control without changing the sequential synchronized action thereof, which takes over upon appearance of the reversal value of the temperature difference.

In order to gain a more complete understanding of the invention a description of the complete operation of the system in which it is embodied will now be undertaken. Assuming again the initial conditions of fuel and air being fed through checker-brick chambers 11 and 12 and combustion being effected in zone 21, the armature 37 will be held in the position shown by the energization of solenoid 27; the relay 70 will be energized by way of its holding circuit which may be traced from supply line 36a, conductor 71, contacts 80c and 70b, the coil of relay 70, conductor 72, and to the other supply line 36b, and relay 65 will be intermittently energized in response to the output voltage Ex of the balanceable network 51. With the switch 31 in the position shown in Fig. 1 the output of radiation pyrometer 30, which records the temperature of the checker-brick in chamber 14, will be connected with the measuring system 32 to effect an unbalance thereof. In attaining balance the measuring system will cause movement of the shaft 44 to adjust potentiometer 52 to an extent related to the magnitude of the temperature of checker-brick chamber 14. Simultaneously therewith, the pen-index 41 will be moved in a downscale direction to make a permanent record on chart 42 of this temperature as indicated at time $t_0$ on the enlarged portion of the chart illustrated in Fig. 5. The capacitor 50 is charged to an extent representative of the temperature of checker-brick chamber 14 by way of a circuit from slidewire contact 52a, contacts 91, contacts 92, slidewire 57, and to an end terminal of slidewire 52.

The shorting switch 91 is now opened by the action of its associated cam 91a and the double-pole, double-throw switch 31 is operated to connect the output of the radiation pyrometer 29, viewing the temperature of checker-brick chamber 12, with the measuring system 32. During the time that the measuring system is attaining balance and causing a readjustment of potentiometer 52, it will be observed, by reference to Fig. 6, that switches 91, 92 and 93 are opened to isolate the charge on capacitor 50 and that upon the system attaining balance, at time $t_1$ (Fig. 5), the switch 93 is closed. Upon the closure of switch 93 the charge on capacitor 50 is compared with the voltage produced by potentiometer 52 against the difference voltage $E_D$ of potentiometer 57, producing thereby the resultant voltage Ex. The resultant signal voltage Ex, assumed at this point to have a positive polarity, is placed upon the input of an alternating-current amplifier 61 by way of a circuit including input conductors 54 and 55, filter 62, converter 63, and direct-current blocking condenser 64.

The converter 63 is shown as including a pair of stationary contacts respectively connected to the output side of filter 62. The operating coil 63a of the converter is energized from supply lines 36a, 36b and the converter may be of the polarized type to produce of the direct-current signal Ex an alternating-current signal at the input of amplifier 61 of a frequency of that of supply lines 36a, 36b. The filter 62 provides a low impedance to ground on the input side of the converter 63 in order to prevent alternating-current possibly picked up by lines 54 and 55 effecting the sensitive device 60, and the capacitor 64 prevents the passage of spurious direct-current signals to the input of the amplifier 61.

The output of amplifier 61 is connected by way of conductors 81 and 82 to a grid control rectifier 83 which comprises the sensitive device 60. The grid control rectifier 83 is comprised of a twin triode of the 5963 type deriving plate voltage from a center tap transformer 84 and is thereby phased so that either one side or the other will conduct, dependent upon the phase of the output signal from the amplifier 61 as applied to the grids 83a, 83b. The conduction of rectifier 83 energizes either relay 65 connected in plate circuit 83c, or relay 66 connected in plate circuit 83d.

Under the present assumed conditions, the relay 65 will be operated each time the voltage Ex is produced by the balanceable network 51. During the interval of time that relay 65 is energized to close its associated contact 65a, the interrupter switch 90 will be closed by cam 90a. However, there will be no affect upon the overall system inasmuch as relay 70, which is normally affected by this sequential operation is presently energized through its own holding circuit as initially described.

The above-described operation will continue until the temperature difference between checker-bricks 12 and 14 attains a predetermined value as determined by the setting of potentiometers 56 and 57. When this condition, illustrated at time $t_2$, Fig. 5, is attained, the voltage Ex produced by the balanceable network will be of an opposite polarity, for at this point the positive value of $(E_1-E_2)$ has exceeded the value of $E_D$. Ex, now being of a negative polarity, will effect a change of phase in the output of amplifier 61 which, in turn, will cause the energization of relay 66 and the deenergization of relay 65. In operation the relay 66 will open its interlock contact 66b and close contact 66a to cause the operation of relay 80 by way of the circuit from supply line 36a, closed interrupter switch 90, contact 66a, relay coil 80, and to the other supply line 36b. The energization of relay 80 will close contact 80a to energize solenoid 28, and simultaneously contact 80c will be opened to break the holding circuit of relay 70 and to effect the deenergization thereof. Therefore, with the operation of relay 80, solenoid 28 will be energized by way of supply line 36a, conductor 38, solenoid coil 28, contact 80a, and supply line 36b, and the solenoid 27 will be deenergized whereupon the armature 37 will be operated to reverse the positions of valves 16 and 19. A signal light 101 connected across the solenoid 28 will be illuminated remotely to indicate the operation of the solenoid. With the reversal of valves 16 and 19 fuel and combustion air will now flow through checker-brick chambers 13 and 14 which give up their heat thereto, and the products of combustion will flow through checker-brick chambers 11 and 12 which will acquire heat therefrom. Relay 80 will be maintained in an energized condition through its holding circuit above described.

The reversal in operative conditions of relays 70 and 80 will effect, in the balanceable network 51, the equivalent circuit disclosed in Fig. 4 by way of the closure of contact 70d and the opening of contact 80d, Fig. 1. As heretofore explained, this connection will maintain negative the polarity of the signal voltage Ex until the temperature of checker-brick chamber 12 exceeds that of checker-brick chamber 14 by the amount determined by the setting of potentiometers 56 and 57, whereupon as illustrated at time $t_3$, Fig. 5, relay 65 will again be energized upon a reversal of polarity of voltage Ex, and the system will resume the operation initially described.

The above-described sequence of operations may continue indefinitely, as illustrated in Fig. 5, the system reversing the operation of the regenerative furnace 10 in accordance with the temperature difference between checker-brick chambers 12 and 14 as determined by the balanceable network 51. However, if during the operation of the furnace, the temperature $T_{14}$ should exceed a critical value before the difference temperature has reached the reversal value necessary for operation of the reversing system, the furnace will be reversed. When the temperature of the checker-brick chamber 14 attains the critical value, the switch 96 will be closed by cam 96a to energize the reversing relay 80 by way of the circuit from supply line 36a, contacts 96, conductor 74, contacts 95, conductor 75, the coil of relay 80, and to the other supply line 36b. The energization of relay 80, during that period when relay 70 is energized solely by way of its holding circuit, will cause the reversal of the furnace in a manner described above.

If after reversal the temperature within the checker-brick chamber 12 should later become critical, the high point reversing control will effect a reversal of furnace operation by energizing relay 70 through the circuit from supply line 36a, closed contacts 96, conductor 74, contacts 94, conductor 76, the coil of relay 70, conductor 72, and to the other supply line 36b.

The operation of relays 70 and 80 by the high point reversal control will have the same effect upon the control system as though the operation thereof were effected by the polarity-sensitive device 60 which is normally energized in response to the difference voltage output of network 51. Therefore, it may be said that the high-point temperature control brings about a virtual condition of temperature difference because the system now upon being reversed will continue to operate until a further reversal is effected by either a condition of actual temperature difference or, as may be the case, a reversal of the furnace due to the temperature of the checkerbrick chambers attaining the aforementioned critical degree of temperature.

Obviously, many modifications and variations of the present invention are possible in the light of the above teachings without departing from the spirit or scope of the invention as defined by the appended claims.

What is claimed is:

1. A control system comprising a source of voltage, means for adjusting said source to produce a voltage representative of the magnitude of a condition, a capacitor, means for charging said capacitor to a voltage related to said produced voltage, said adjusting means being subsequently operable for adjusting said source of voltage to produce a second voltage of magnitude related to the magnitude of a second condition, a detector, means for comparing the voltage of said capacitor with said second produced voltage for application to said detector of a difference voltage, and means including a pair of circuit-controlling devices connected to the output of said detector for operation of one of them when said difference voltage is in one direction and for operation of the other of them when said difference voltage is in the opposite direction.

2. In a condition-difference control system of the type including condition-responsive means respectively responsive to different conditions, the combination of a network including means for unbalancing it in response to one of the condition-responsive means and to a magnitude representative of one of said conditions and for subsequently unbalancing said network in response to another of the condition-responsive means and in accordance with the magnitude of the other of said conditions, said network including a capacitor, means for charging said capacitor to a voltage of magnitude related to the unbalance of said network established in accordance with one of said conditions, means for comparing the charge on said capacitor with a potential of magnitude related to the unbalance of said network established by the other of said conditions, and means for initiating a control action in dependence upon the relative magnitude of said potential and said voltage acquired by said capacitor.

3. The combination set forth in claim 2 in which a single variable impedance is adjusted first to unbalance said network in accordance with the magnitude of one of said conditions and subsequently is adjusted for unbalancing said network in accordance with the magnitude of the other of said conditions.

4. In a control system of the type including means respectively responsive to different conditions, the combination of a network including a means responsive to the condition-responsive means for unbalancing said network in accordance with the magnitude of one of said conditions and for subsequently unbalancing said network in accordance with the magnitude of the other of said conditions, said network including a capacitor, means for charging said capacitor to a voltage of magnitude related to the unbalance of said network established by one of said conditions, means for producing a voltage representative of a maximum allowable difference between said conditions, the subsequent unbalancing of said network producing a potential of magnitude related to the magnitude of said other of said conditions, means for comparing said representative voltage and the charge on said capacitor with said potential polarity responsive means for initiating a control action when the difference between said potential and said voltage acquired by said capacitor exceeds the magnitude of said representative voltage, and means responsive to the control action for reversing the polarity of said representative voltage to condition the control system for response to changes in the conditions in opposite sense.

5. The method of cyclically producing a reversal in the control characteristics of two conditions upon the attainment between the conditions of a predetermined absolute difference in the controlled characteristics comprising the steps of producing a voltage of magnitude representative of the magnitude of the characteristic of one of the conditions, storing said voltage, producing a voltage commensurate with the magnitude of the characteristic of the other condition, subtracting the stored voltage from the voltage representing the magnitude of the other condition to produce a difference voltage, producing a biasing voltage representative of the extent of difference between the characteristics of the conditions at which a reversal is to be effected, comparing the difference voltage to the biasing voltage to derive a signal voltage, reversing the control characteristics when said signal voltage reverses polarity and reversing the sense of the biasing voltage each time the difference of the stored voltage and the voltage representative of the second characteristic exceeds the extent of the biasing voltage.

6. A control system comprising a capacitor, means including adjustable means for charging said capacitor to an extent representative of the magnitude of a first condition less a bias voltage of predetermined amount commensurate with a desired difference in magnitude between the first condition and a second condition, means for varying said adjustable means to produce a voltage representative of the second condition, means for comparing the charge on said capacitor with said representative voltage, a polarity-responsive means selectively operable upon the charge exceeding the voltage, and means for reversing the effect of the bias voltage, said last-named means comprising a source of voltage of extent twice that of the bias voltage and in opposition to the voltage representative of the second condition.

7. A control system comprising a capacitor, means including adjustable means for charging said capacitor with a voltage whose magnitude is representative of a first condition less a bias voltage of predetermined amount commensurate with a desired maximum difference between the first condition and a second condition, means for varying said adjustable means to produce a voltage representative of the magnitude of the second condition, means for comparing the voltage on said capacitor with said representative voltage, and a polarity-responsive means selectively operable upon the voltage on said capacitor exceeding said representative voltage.

8. A control system comprising a capacitor, means including adjustable means for charging said capacitor to an extent of a first condition less a bias voltage of predetermined amount commensurate with a desired difference between the first and second conditions, means for varying said adjustable means to produce a voltage representative of the magnitude of the second condition, means for comparing the charge on the capacitor with said representative voltage less a predetermined amount commensurate with twice the bias voltage, and polarity-responsive means to be selectively actuated when the voltage representative of the second condition less twice the bias voltage exceeds that of the charged capacitor.

9. The combination with a regenerative furnace having a plurality of regenerative chambers, and means for selectively controlling the flow of combustion materials through said chambers, of temperature-sensitive means associated with each chamber for producing a signal representative of the temperature of the chambers, means for producing a voltage in response to one of the temperature-sensitive devices, a capacitor, means for connecting the capacitor in circuit with said voltage-producing means to charge the capacitor to a voltage representative of the temperature of one of said chambers, means for subsequently adjusting said voltage producing means for production of a potential representative of the temperature of the other of said chambers, means for comparing the voltage of said capacitor with said subsequent potential to derive thereby a difference voltage, and means responsive to the sense of the difference voltage for effecting an operation of the selective means controlling the flow of combustion materials through said chambers.

10. The combination of claim 9 in which the sense of the difference voltage changes upon the attainment of a predetermined difference between said voltage and said potential, and in which said predetermined difference is determined by a bias voltage producible across an impedance.

11. The combination with a regenerative furnace having a plurality of regenerative chambers, and means for selectively controlling the flow of combustion materials through said chambers, of temperature-sensitive means associated with each chamber for producing signals respectively proportional to the temperature of the chambers, a source of potential, a variable impedance connected across the source of potential, a capacitor, means for connecting said capacitor in circuit with said impedance, means for selectively adjusting the said impedance in response to a signal from one of said temperature-sensitive means to charge the capacitor to a potential proportional to the magnitude of said signal, means for comparing the potential of said capacitor with a potential produced by said variable impedance in response to a subsequent signal from another of the temperature-sensitive means to obtain a difference voltage, and means responsive to the sense of said difference voltage for selectively operating said means controlling the flow of combustion materials through said chambers.

12. In a temperature-difference control system, the combination of temperature-sensitive means, each responsive to different temperatures to produce an electrical signal proportional thereto, a measuring system including a balanceable network, means for successively connecting said temperature-sensitive means to said measuring system to cause an unbalance thereof, means for controlling the relative magnitudes of said temperatures, a second network having an impedance operable to produce unbalance of said second network in accordance with the unbalance of said measuring system, said second network including a capacitor for storing the extent of unbalance produced by one of said temperatures, means for comparing the extent of unbalance stored by said capacitor with a second unbalance of said second network produced by subsequent adjustment of said impedance in accordance with another of the temperatures, and means responsive to the difference of said unbalances for operating said temperature-controlling means to limit the difference between said temperatures.

13. The combination of claim 12 in which said second network includes means for introducing a voltage to establish a predetermined temperature difference which must be exceeded by the unbalance difference of said second network before said operating means responds.

14. In a system for controlling the reversal of a regenerative furnace having a plurality of checker-brick chambers, a balanceable network having an adjustable impedance, means for alternately positioning the adjustable impedance in accordance with the temperature of the checker-brick chambers of the furnace to effect an unbalance of the network, a capacitor for storing the extent of unbalance of said network, a pair of serially-connected impedances connected with the capacitor at their juncture point and across said variable impedance, said impedances providing a potential representative of a maximum temperature difference to be permitted between said chambers, means for controlling the relative magnitude of the temperatures of the checker-brick chambers, means for serially connecting one of said impedances with said capacitor and a portion of said variable impedance upon said variable impedance being adjusted in accordance with the temperature of the other chamber to produce a signal representative of the furnace condition, and means responsive to said signal for operating said maximum temperature-controlling means to limit the temperature difference between said chambers.

15. In a balanceable network for determining the extent and sense of temperature difference between two conditions, a variable impedance for unbalancing said network in response to the temperature of one of said conditions, a capacitor for storing the extent of unbalance of said network, a pair of serially-connected impedances connected with the capacitor at their common juncture point and across the variable impedance, said impedances providing a potential representative of a maximum temperature difference to be permitted between said conditions, and means for serially connecting said impedances with said capacitor and a portion of said variable impedance upon said variable impedance being adjusted in accordance with the temperature of the other condition for producing a signal representative of temperature difference.

16. The combination of claim 15 in which said impedances are of the variable type so as to adjust the maximum allowable temperature difference between said conditions.

17. A control system comprising means responsive to the magnitudes of two conditions, a pair of electromechanical devices, a condition-difference control means for producing a signal in response to the output of said responsive means upon the occurrence of a predetermined difference in magnitude between the conditions selectively to energize a first of said electromechanical devices, a condition-magnitude responsive device, means for periodically connecting said condition-magnitude responsive device alternately with each of said electromechanical devices in series circuit relation for energizing a second of said electromechanical devices upon one of the conditions exceeding a predetermined magnitude, and means operable by said second electromechanical device for deenergizing said first electromechanical device, said difference-control means again taking over control upon reduction in magnitude of said one of said conditions below said predetermined magnitude and upon the recurrence of said predetermined magnitude of condition difference.

18. The combination with a regenerative furnace having a plurality of regenerative chambers, and means for selectively controlling the flow of combustion materials through one or the other of said chambers, of temperature-sensitive means associated with each chamber for producing a signal representative of the temperature of the chambers, means for producing a voltage in response to one of the temperature-sensitive devices, a capacitor, means for connecting the capacitor in circuit with said voltage-producing means to charge the capacitor with a voltage representative of the magnitude of temperature of one of said chambers, means for comparing the voltage of said capacitor with a subsequent potential produced by said first-mentioned means is response to a signal from another of the temperature-sensitive means to derive thereby a difference voltage, means responsive to a change in the sense of the difference voltage for effecting an operation of the selective means controlling the flow of combustion materials through one or the other of said chambers, and means responsive to the magnitude of the temperature of the regenerative chambers for operating the selective means controlling the flow of the combustion materials through one or the other of said chambers when the temperature of either of said chambers exceeds a predetermined value.

References Cited in the file of this patent

UNITED STATES PATENTS

| | | |
|---|---|---|
| 1,886,430 | Schofield | Nov. 8, 1932 |
| 1,950,614 | Krogh | Mar. 13, 1934 |
| 2,459,632 | Engstrom | Jan. 18, 1949 |
| 2,514,054 | Hallden | July 4, 1950 |
| 2,565,892 | Stanton | Aug. 28, 1951 |